United States Patent
Yuan et al.

(12) 
(10) Patent No.: US 6,514,333 B1
(45) Date of Patent: *Feb. 4, 2003

(54) PREPARATION AND USE OF HIGH BRIGHTNESS KAOLIN PIGMENTS

(75) Inventors: Jun Yuan, Milledgeville, GA (US); Vince H. Brown, Sandersville, GA (US); Robert J. Pruett, Milledgeville, GA (US); William L. Garforth, Sandersville, GA (US)

(73) Assignee: Imerys Pigments, Inc., Rosewell, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/700,027

(22) PCT Filed: May 10, 1999

(86) PCT No.: PCT/US99/10155
§ 371 (c)(1), (2), (4) Date: Nov. 9, 2000

(87) PCT Pub. No.: WO99/58613
PCT Pub. Date: Nov. 18, 1999

Related U.S. Application Data
(60) Provisional application No. 60/084,943, filed on May 11, 1998.

(51) Int. Cl.$^7$ .............................................. C04B 14/04
(52) U.S. Cl. ....................................... 106/486; 106/484
(58) Field of Search ................................. 106/484, 486

(56) References Cited

U.S. PATENT DOCUMENTS

| | | |
|---|---|---|
| 2,992,936 A | 7/1961 | Rowland et al. |
| 4,075,030 A | 2/1978 | Bundy et al. |
| 4,076,548 A | 2/1978 | Bundy et al. |
| 4,078,941 A | 3/1978 | Bundy et al. |
| 4,738,726 A | 4/1988 | Pratt et al. |
| 4,943,324 A | 7/1990 | Bundy et al. ................ 106/486 |
| 5,085,707 A | 2/1992 | Bundy et al. |
| 5,128,606 A | 7/1992 | Gate et al. |
| 5,168,083 A | 12/1992 | Matthews et al. |
| 5,169,443 A | 12/1992 | Willis et al. ................ 106/486 |
| 5,411,587 A | 5/1995 | Willis et al. ................ 106/486 |
| 5,576,617 A | 11/1996 | Webb et al. |
| 6,149,723 A | * 11/2000 | Pruett et al. ................ 106/486 |

* cited by examiner

*Primary Examiner*—Mark L. Bell
*Assistant Examiner*—Shalie Manlove
(74) *Attorney, Agent, or Firm*—Finnegan, Henderson, Farabow, Garrett & Dunner, L.L.P.

(57) ABSTRACT

A novel clay pigment, the manufacture thereof and the use of the pigment in the coating of lightweight groundwood paper are disclosed. The kaolin clay particles initially have a shape factor between less than 10 and a particle size distribution where between 30 to 60% by weight is less than 2 microns and 20% by weight is less than 0.25 micron e.s.d. This clay is subjected to attrition grinding to produce clay particles having a shape factor between 13 and 18 and then classified to produce a particle size distribution where 80 to 90% by weight are less than 2 microns and 20% by weight are less than 0.25 micron. These pigments have a G.E. brightness ranging from 88 to 92; are deficient in ultra-fine particles; are fluid at a high solids concentration greater than 70%, and have a low shear Brookfield viscosity below 500 cps and a high shear Hercules viscosity of 18 dyne-cm above 200 rpm when using an "A" bob.

12 Claims, No Drawings

PREPARATION AND USE OF HIGH BRIGHTNESS KAOLIN PIGMENTS

This application claims the benefit of provisional application No. 60/084,943, filed May 11, 1998.

FIELD OF THE INVENTION

The invention relates to a platey, fines deficient delaminated kaolin composition for particular use as a lightweight coating (LWC) for groundwood paper and comprising platelets produced by grinding a coarse fraction or a whole fraction of the kaolin crudes to a shape factor ranging from about 13 to about 18 where there is a substantial amount of platelets and an insubstantial amount of ultrafines.

BACKGROUND OF THE INVENTION

It is well known in the paper industry that a wide variety of pigments, such as titanium dioxide, calcium carbonate, talc, synthetic silicates, and clays such as bentonite and kaolin, are suitable for use as paper fillers and/or coatings. Kaolin, a natural occurring hydrated aluminate silicate, is presently the most widely utilized and is available in a range of particle sizes and brightness, as well as being either delaminated or non-delaminated.

Kaolin clay pigments are obtained from kaolin crudes. The crudes contain kaolin particles, oversize (grit) and fine and coarse particle size impurities. Some of the impurities (e.g., fine ferruginous or titaniferous impurities) impart undesirable color to the clay. Other impurities have an undesirable effect on the rheology of the kaolin.

The kaolin portion of kaolin crudes is "polydisperse" in the sense that the particles occur over a range of sizes and shapes. Thus, a kaolin crude will not contain particles of a single size such as, for example, particles all of which are 2 micrometers. Typically a degritted kaolin crude will contain particles ranging in size from submicron or colloidal to particles 20 micrometers or larger.

Kaolins from different deposits, or even from different zones in the same deposit, can vary widely in the content of impurities, particle size distribution as well as the morphology of the kaolin particles. In general, crude kaolin particles are composed of individual platelets, and stacks or booklets concentrated in the greater than 2 micron faction. Particle sizes of kaolins are conventionally determined by sedimentation using Stokes law to convert settling rates to particle size distribution, and assume a spherical particle shape for the kaolin particles. Hence, the use of the conventional term "equivalent spherical diameters (e.s.d.)" to designate particle size.

Hydrous kaolin is white in color, has a fine particle size, is relatively chemically inert, and makes an ideal low cost paper filler. Calcined (anhydrous) kaolin is also available for use as a paper filler and can impart greater opacity to paper than the hydrous kaolin, but has the serious disadvantage of being more abrasive.

Prior art kaolin paper fillers and coatings are typically produced by a beneficiation process which typically consists of fractionating in a continuous centrifuge to remove oversize material followed by leaching to remove iron-based colored compounds. In the leaching process the kaolin is acidified with $H_5SO_4$ to a pH of 3.0 to solubilize the iron. Sodium hydrosulfite is then added to reduce the iron to a more soluble ferrous form which is removed during the dewatering process. The flocculated clay, generally at approximately 30% solids by weight, is then filtered, such as by dewatering on a rotary vacuum filter to a solids level approximately 60% by weight. The filter cake is then dried or redispersed with additional dry clay if it is to be sold as approximately 70% by weight solids slurry. To produce high brightness products, i.e., fillers having a brightness index greater than 90, impurities may be removed from the kaolin clay through flotation or magnetic separation. To produce a delaminated product, the coarse fraction from the initial centrifugation is ground in sand, grinders to shear the stacks of platelets normally found in kaolin and thereby produce individual particles having an equivalent spherical diameter less than 2 microns.

It is well appreciated in the art that kaolin clay pigments must have certain Theological and optical properties to be suitable for use in paper manufacture as paper coatings or paper fillers. The kaolin clay pigment must be available as a high solids suspension typically having a clay solids content of about 50% to about 70% by weight, but still exhibiting a viscosity low enough to permit efficient and economical pumping, mixability with other filler or coating components, and application to the paper. Additionally, it is of utmost importance that the kaolin pigment exhibit certain optical properties, namely high brightness, high gloss, and high opacity.

The influence of particle size distribution upon the optical properties of kaolin pigments, has long been appreciated in the art. For example, in U.S. Pat. No. 2,992,936, Rowland discloses that a kaolin clay product having the following particle size distribution (in terms of equivalent spherical diameter, e.s.d.) will consistently show improved brightness, gloss and opacity when used as a paper coating clay:

99–100% by wt. less than 5 microns e.s.d.
98–100% by wt. less than 4 microns e.s.d.
88–100% by wt. less than 1.7 microns e.s.d.
85–97% by wt. less than 1.5 microns e.s.d.
70–84% by wt. less than 1.0 microns e.s.d.
25–37% by wt. less than 0.5 microns e.s.d.
10–15% by wt. less than 0.3 microns e.s.d.

Rowland further discloses producing such a controlled particle size kaolin product by first degritting a kaolin clay slurry, thence passing the degritted kaolin clay slurry at 21% solids by weight through a Sharples centrifuge at 400 cc per minute at 6300 r.p.m. and then recentrifuging the overflow effluent at the same rate and r.p.m. The final overflow effluent represented a cut taken off the fine end of the degritted clay slurry and amounted to 22% by weight of the degritted clay slurry. The degritted clay slurry remaining after removal of this 22% fine cut, i.e., the combined underflows from the two centrifugation steps, was reslurried to about 20% solids with 0.15% sodium hexametaphosphate and allowed to settle. The sedimented coarse clay which amounted to about 48% of the degritted clay slurry, was discarded leaving about 30% by weight of the original degritted kaolin clay slurry as an intermediate product to be subjected to further treatment via bleaching, filtering and drying to yield a commercial coating clay product.

In a paper entitled "Chemically Induced Kaolin Floc Structures for Improved Paper Coating", presented at the 1983 TAPPI Coating Conference, W. H. Bundy et al. disclosed an improved high bulking paper coating pigment, referred to as 1089, which comprises a chemically modified kaolin produced by the Georgia Kaolin Company, Inc. and marketed under the trade name Astra-Lite. Structures of optimum functionality are said to be derived by chemically treating a base kaolin clay having a particle size distribution wherein from about 80% to 93% by weight of the kaolin particles are less than 2 microns e.s.d. to selectively flocculate a portion of the submicron fines therein thereby aggregating a portion of these fines on the surface of larger kaolin platelets and effectively inactivating large portion of colloidal particles. Such a chemically modified kaolin coating pigment derived from a base kaolin wherein 92% by weight particles under 2 microns is presented by Bundy et al. having a particle size distribution as follows:

99% by wt. less than 5 microns e.s.d.
97% by wt. less than 3 microns e.s.d.
90.5% by wt. less than 2 microns e.s.d.
65.5% by wt. less than 1 microns e.s.d.
31.5% by wt. less than 0.5 microns e.s.d.
12.5% by wt. less than 0.3 microns e.s.d.
5.5% by wt. less than 0.17 microns e.s.d.

Such a chemically flocculated kaolin coating pigment may be produced, for example, as disclosed, in U.S. Pat. Nos. 4,075,030; 4,076,548; or 4,078,941, by selectively flocculating a base kaolin clay with the addition: of either a low molecular weight (less than 1,000,000) organic flocculant such as a polyfunctional amine, e.g., ethylene diamine or hexamethylene diamine, or long carbon chain amine, with or without citric acid and, optionally, in the presence of fine mica below 150 mesh in size.

There is disclosed in U.S. Pat. No. 4,738,726 an opacifying pigment composition suitable for use as a paper filler or coating which consists essentially of particles of hydrous kaolin clay flocculated with a controlled minor amount of a cationic polyelectrolytic flocculant, e.g., a quaternary ammonium polymer salt or a diallyl ammonium polymer salt. The base kaolin clay is selected to have a particle size distribution prior to flocculation wherein less than 35% by weight are finer the 0.3 microns, i.e., colloidal.

U.S. Pat. No. 4,943,324 to Bundy et al. discloses a high bulking uncalcined kaolin pigment suitable for use as a filler in paper and which exhibits improved opacifying efficiency. The composition essentially consists of kaolin particles which have not only been treated with an amine but also upon which aluminum hydroxide has been precipitated, and of which less than about 20% by weight have a particle size less than 0.3 microns in equivalent spherical diameter. A method is provided for producing the pigment from a hydrated kaolin clay having a brightness of about 89. The selected starting clay is dispersed in water and subjecting as a slurry to delamination, defining, surface treatment with an amine and aluminum sulfate, and leaching. The treated kaolin slurry is subsequently rinsed and filtered to produce a filter cake which is redisposed to yield a commercial paper filler.

U.S. Pat. No. 5,085,707 to Bundy et al. discloses a defined and delaminated kaolin composition exhibiting high opacity which is produced by defining and delaminating a base kaolin clay so as to reduce its colloidal content. The defined and delaminated kaolin composition may also be treated with hexamethylene and aluminum sulfate to further enhance opacity. Whether treated or untreated, the defined and delaminated composition functions superiorly in paper coating formulations, alone or blended with known coating clays, improving the opacity, print gloss, sheet gloss and printability of paper sheet coated therewith.

U.S. Pat. No. 5,168,083 discloses a high opacity defined kaolin clay product having a relatively narrow particle size distribution, low colloidal particle content and an average particle surface area of less than about 30 square meters per gram. This product is prepared by defining an aqueous kaolin clay slurry via controlled centrifugation to remove a substantial portion of the colloidal particles therein. Prior to being subjected to centrifugation, the aqueous kaolin clay slurry is prepared so as to improve the defining process achieved via centrifugation by first subjecting the aqueous kaolin clay suspension to scrub grinding so as to break up agglomerates into individual kaolin particles without substantial delamination of the kaolin clay particles. Thence, the mechanically dispersed kaolin clay suspension is dispersed to its optimum level by the addition of a chemical dispersant, most advantageously sodium hexametaphosphate, and dilution water is admixed into the aqueous kaolin clay suspension to reduce the solids content thereof to a level less than about 18% solids by weight, and preferably to about 50% to about 15% by weight, prior to centrifugation. This patent discloses further processing the underflow aqueous kaolin clay suspension after centrifugation in a manner which prepares the kaolin particles for use as a paper coating clay or for use as paper filling applications.

Delamination generally refers to the operation of subjecting the naturally occurring kaolin stacks in the aqueous clay slurry to shearing force thereby reducing the kaolin stacks or booklets to thin platelets. This shearing action may take place in a sand grinder or carried out in devices such as ball or pebble mills, extruders, or rotor-stator colloid mills. During mechanical delamination, large kaolin particles are disaggregated into smaller particles having a high aspect ratio, principally by parting clay crystals along basal cleavages resulting in a narrowing of the particle size distribution of the delamination particles.

The kaolin pigments produced by mechanical delamination are commercially made and marketed by various producers with processing facilities located in Georgia and South Carolina, using as raw material sources, the Cretaceous and Tertiary kaolin deposits of the region. It is believed that most of these commercially available delaminated kaolin pigments do not possess the unique desirable combination of high opacification and the low viscosity characteristics of some undelaminated pigments.

U.S. Pat. Nos. 5,169,443 and 5,411,587 to Willis et al. and assigned to Engelhard Corporation each disclose a paper coating kaolin pigment comprising mechanically delaminated kaolin particles wherein the pigments possess the opacification, smoothness, and printability advantages of conventional delaminated kaolin pigments but have desirably low viscosity and gloss not characteristic of conventional delaminated kaolin pigments. The kaolin pigment produced by the teachings of U.S. Pat. Nos. 5,169,443 and 5,411,587 involve generally the delamination of a feed material consisting of a mixture of coarse fraction of kaolin crudes or whole crude fractions with fines. The delamination level of these prior art pigments are achieved by controlling the particle size of the kaolin clay.

There is a need to provide a delaminated kaolin pigment obtained from the Cretaceous and Tertiary kaolin deposits of Georgia and South Carolina which has a low viscosity at high solids concentration (i.e. ~70%), which feature is desirably characteristic of undelaminated pigments, and which is deficient in the amount of ultra-fine particles.

SUMMARY OF THE INVENTION

The invention meets this need. The invention provides a process for producing a low viscosity delaminated clay pigment from the kaolin deposits of Georgia and South Carolina whose delamination level can be considered as being controlled particularly by particle shape of the clay. The process involves grinding a kaolin crude having a particle size distribution where about 30 to 60% by weight is less than 2 microns and 20% or less is less than 0.25 micron and a shape factor less than 10 and grinding this clay to a shape factor ranging from about 10 to about 30, preferably from about 13 to about 18, and most preferably 15, and then classifying to obtain a particle size distribution where 80% by weight is less than 2 microns in equivalent spherical diameter (e.s.d.). This kaolin clay to be delaminated can be a whole crude fraction or a coarse fraction reject which may or may not be combined with a fine fraction and which coarse fraction may be obtained from a circuit used to produce any of the many commercial products available in the market place. Such coarse fraction reject may be that obtained from a circuit which produces what is generally classified as a high opacity, defined kaolin clay with a relatively narrow particle size distribution and marketed by the assignee of the present invention, ECC International Inc., as a paper coating or a paper filler disclosed in the above U.S. Pat. Nos. 4,943,324; 5,085,707; and 5,168,083.

These novel pigments have a G.E. brightness ranging from about 88 to about 92; are deficient in ultra-fine particles where less than 20% by weight are less than 0.25 micron e.s.d; and are fluid at a high solids concentration, i.e. 70%. The kaolin clay slurry of the invention at a solids level of about 70% by weight has a low shear Brookfield viscosity below 500 cps, and a high shear Hercules viscosity of about 18 dyne-cm above 200 ppm using an "A" bob. The product produced by the invention is generally comprised of platelets with very few stacks and a small percentage of fines which is especially useful for high-spec coating of lightweight groundwood paper. The pigments of the invention may be used as single pigments or in blends with other kaolin products or other minerals in coating formulations to coat paper and paperboard.

It is, therefore, an object of the invention to provide a lightweight coating (LWC) for a groundwood paper product which comprises kaolin clay particles having a shape factor ranging between 13 and 18.

It is a further object of the invention to provide a process for preparing a coating for a lightweight groundwood paper based on the particle shape of the kaolin clay particles.

A further object of the invention is to provide a method for controlling the degree of delamination of kaolin clay particles for use as a coating on lightweight goundwood paper products. More particularly, the invention involves measuring the shape factor of the kaolin particles and grinding the particles until the shape factor ranges between 13 and 18 and capable of producing a high solids concentration slurry of 70% by weight.

These and other objects and advantages of the present invention will be better appreciated and understood in reading the detailed description of the preferred embodiments.

DESCRIPTION OF THE PREFERRED EMBODIMENTS

The invention relates to the manufacturing of a delaminated kaolin clay product for particular use as a coating for light weight groundwood (LWC) paper. Preferably, during the processing of the kaolin clay, the crude is subjected to a grinding step where the shape factor is brought from less than 10 up to a shape factor ranging from about 10 to 30, preferably from about 13 to 18, and most preferably 15. The shape factor is equated to the morphology of the pigment, and is measured by a device disclosed in U.S. Pat. Nos. 5,128,606 and 5,576,617, the disclosures of which are incorporated herein by reference. These patents, are assigned to ECC International Limited, the parent company of the assignee of the present invention. "Shape factor" is a measure of an average value of the ratio of mean particle diameter to particle thickness for a population of particles of varying size and shape as measured using the electrical conductivity method and apparatus described in the aforesaid U.S. Pat. No. 5,128,606 and using the equation derived in the patent specification of U.S. Pat. No. 5,128,606. "Mean particle diameter" is defined as the diameter of a circle which has the same area as the largest face of the particle. Generally, if the shape factor is between 0 and 10, then the kaolin clay is composed substantially of thick stacks or booklets, where the e.s.d. is 2 to 5 $\mu$. This may be considered as being too "blocky" for some applications. If the shape factor is between 10 and 30, the clay is composed substantially of individual thick platelets, which may be considered as being "platy". If the shape factor is between 30 and 60, the clay is composed of numerous thin platelets, which maybe considered as "too platy" for many practical commercial applications, such as coating for paper products.

The process of the invention involves grinding a kaolin crude with a particle size distribution where about 30 to 60% by weight is less than 2 microns and less than 20% by weight is less than 0.25 micron and with a shape factor less than 10 (the kaolin clay is "blocky"), and grinding the kaolin clay to a shape factor ranging from about 10 to 30, more preferably from about 13 to 18, and most preferably about 15, and then classifying the clay to obtain a particle size distribution where about 80% to about 90% by weight is less than 2 microns e.s.d. This crude used in the invention may be a whole crude, a coarse fraction of a whole crude, or a coarse fraction of a reject from a circuit used to produce any of the commercial clay products preferably having a shape factor between about 0 and 10 and a particle size distribution such that about 30% by weight to 60% by weight is less than 2 microns and <20% by weight is <0.25 micron e.s.d.

In the present application, all values for the particle size distributions (p.s.d.) are given in equivalent spherical diameters (e.s.d.).

A typical process for beneficiating a crude kaolin used in the invention may involve blunging the clay crude with water and dispersing it in a conventional manner in a commercially available blunging apparatus to produce an aqueous slurry of crude kaolin clay typically having a solids content ranging from about 20% to 70% by weight solids. This aqueous kaolin clay slurry may next be degritted, as in conventional practice, to remove substantially all particles in excess of 44 microns (i.e.,+325 mesh) equivalent spherical diameter (e.s.d.) The degritting of the crude kaolin slurry may be carried out by first passing the crude kaolin slurry through a screening device, such as a sandbox, to remove the coarsest material in the slurry and then fractionating the screened kaolin clay slurry on a classifier or Bird centrifuge to separate a coarse fraction comprising particles greater, than about 5 microns e.s.d. therefrom, which coarse fraction which generally may have been discarded, can be used as the feed material or part of the feed material in the invention.

The feed material for the invention can be made into an aqueous slurry typically having a solids content ranging from about 30% to about 60% by weight solids. This aqueous slurry or slip is then passed through the magnetic separator to remove a substantial portion of the iron impurities and produce a relatively low content, degritted clay slurry in the separator. In the separator, the slip may be retained for about 2 to 3 minutes at about 2,000 gause. From the separator, the slip is passed through an attrition grinder.

Preferably, the particle size distribution of the kaolin particles going into the grinder range between 30 to 60% by weight <2 microns and less than 20% by weight <0.25 µm and the shape factor is less than 10. In the grinder, the particles are delaminated and ground to a shape factor ranging from between 13 and 18. The slip from the grinder is then passed through a classifier to where about 80 to 90% by weight of the particles are less than 2 microns.

From the classifier, the slip is then bleached or leached to remove iron-based colored compounds. In the leaching process, the kaolin clay maybe acidified with $H_2SO_4$ to a pH of 3.0 to solubilize the iron. Sodium hydrosulfite is then added to reduce the iron to a more soluble ferrous form which is removed during the dewatering process. The slip from the leaching process then, in a conventional manner, is flocculated generally at approximately 30% solids by weight then filtered, rinsed and spray dried. The filter may be a rotary vacuum filter where the kaolin slurry is dewatered to a solids level of approximately 50 to 60% by weight and then dried to about 70% by weight solids.

Delamination as used in the invention refers to the operation of subjecting the naturally occurring kaolin stacks in the aqueous clay slurry to a shearing force thereby reducing the kaolin stacks to thin platelets. Delamination can be carried out by subjecting an aqueous slurry of stacked kaolin particles to shearing action in a sand grinder, ball or pebble mills, extruders, or rotor-stator colloid mills. The invention is described herein where the delamination occurred by use of an attrition grinder, however, it is to be appreciated that the various shearing devices in the art with the various media may be used.

The final kaolin pigment produced by the invention has a G.E. brightness between 88 and 92, and preferably 90.2, and a particle size distribution where 80% by weight of the pigments are less than 2 microns; and 10 to 20% by weight are less than 0.25 micron. The final product pigments of the invention are capable of forming clay-water slurry at 70% solids which have a low shear viscosity below 1000 cps, preferably below 500 cps when measured by the Brookfield Viscometer at 20 rpm. The high, shear Hercules viscosity for this slurry is at 18 dyne-cm at above 200 rpm, using the "A" bob.

In the invention, it is believed that the delamination of kaolin stacks is essentially complete when the clay particles are ground to a shape factor of about 15.

Further grinding to a shape factor greater than 20 may cause attrition of individual platelets and may result in reducing the plate face dimensions or producing ragged edges on the individual platelets, both of which are undesirable for this kaolin product for particular applications as a coating on lightweight groundwood paper.

EXAMPLE 1

A kaolin clay crude which was a coarse clay (i.e., soft kaolin) from Georgia was blunged, degritted, and classified to produce a fraction (A) generally comprising particles less than 5 microns e.s.d. and a coarse fraction (B) comprising particles greater than about 5 microns e.s.d. The coarse fraction (B) was used as feed material and further processed. From Table 1, the particle size distribution of the feed material had a brightness of 80.8, a $TiO_2$ content of 1.5226, and a $Fe_2O_3$ content of 0.293%. The particle size distribution was 64.5% by weight <5 microns; 33.4% <2 microns; 11.2% <0.5 microns; and 4.2% <0.25 microns. The shape factor was 5.7. The properties and characteristics for the kaolin particles for the sequential steps of magnetic separating, grinding, classifying, and filtering are shown in Table 1. As can be seen in Table 1, the shape factor (S.F.) increased from 5.7 to 17.7 after the filtering step and the product was capable of making down at 70% solid concentration. The final product after filtering is high in brightness (90.18), deficient in ultra-fines (14.4% by weight <0.25 µm), and fluid at very high solid concentrations (70% solids).

TABLE 1

|  | B Fraction | Grinder Discharge | Final Product |
| --- | --- | --- | --- |
| Brightness | 80.8 | 88.39 | 90.18 |
| Particle size (e.s.d.): |  |  |  |
| % <5 µm | 64.5 | 86.8 | 99.1 |
| % <2 µm | 33.4 | 53.3 | 79.8 |
| % <1 µm | 19.9 | 33.3 | 56.1 |
| % <0.5 µm | 11.2 | 18.8 | 32.9 |
| % <0.25 µm | 4.2 | 7.3 | 14.4 |
| Shape Factor | 5.7 | 13.2 | 17.7 |
| Brookfield |  |  | 190 rpm |
| Hercules at 18 dynes |  |  | 320 rpm |
| % Solids |  |  | 70 |

After the filtering step of the invention, if the percentage by weight of 0.25 micron portion is greater than 20% by weight, then it is anticipated by the inventors that a defining step can be employed. Preferably, this defining step can be added after the classifying step.

Defining as used herein refers to the operation of separating and discarding a percentage of the fine fraction of the kaolin suspension. The defining operation may be carried out in the Bird centrifuge where the suspension is separated into a coarse fraction and a fine fraction. A selected percentage by volume of the fine fraction is discarded, while the remainder of the fine fraction is admixed with the coarse fraction for further processing. The percent defining level expressed refers to the volume percentage of the fine fraction which is discarded. For example, defining to a level of 40% means that the fine fraction from the centrifuge was discarded and the remaining 60% of the fine fraction from the centrifuge was admixed with the coarse fraction from the centrifuge for further processing.

If a defining step is used in the process of the invention, then the fine fraction can be defined to a level of about 40%. The fines in the fine fraction can be particles having a particle size distribution where less than 20% by weight are less than 0.25 micron.

EXAMPLE 2

This example illustrates the effect the shape factor can have on the fluidity of delaminated products. A blend of Georgia Cretaceous crude clays (i.e, coarse clays) was blunged, degritted, and classified to produce a coarse reject and a No. 1 clay particle size fine fraction. The coarse reject fraction had a particle size distribution of:

83.4% finer than 1 microns;

31.70% finer than 2 microns;

10.3% finer than 0.5 microns;

3.5% finer than 0.25 microns;

and a shape factor of 5.7. This coarse fraction was used to produce the product of the invention. The slurry was first passed through a magnet at 2 minutes retention time, followed by delamination. In this example, four sub-samples were produced from the same feed clay by delaminating the clay to progressively higher shape factors, i.e., shape factors of 10, 15, 20, and 30. Each delaminated slip was then classified to approximately 80% less than 2 micron particle size and bleached using conventional reductive leaching techniques.

Table 2 below shows that when the clay was ground to a shape factor of 20 or above, the delaminated and classified final products were no longer capable of making down at 70% solid concentration. In contrast, when the clay was ground to a shape factor of 10 or 15, it yielded final products that were capable of being made down at 70% solids. The fluidity at high solids concentration is important to both product handling and application. Paper makers generally find it more advantageous to have a high solids slurry kaolin product for the maximum gain in paper brightness and gloss characteristics. On the other hand, if the delamination is not sufficient, then there will be too many kaolin stacks left in the clay. These stacks are detrimental to paper gloss when the clay pigment is applied as coating on the surface of paper. Another feature of the product of the invention is that it is deficient in ultra-fine particles (particles with less than 0.25 micron equivalent spherical diameter, E.S.D.) Notice that the less than 0.25 micron fractions for all centrifuged and leached products were below 15%. The deficiency in ultra-fine particles is advantageous when the pigment clays are used for certain coating papers, such as LWC applications. All final products made 89 or above brightness and can therefore be considered as high brightness delaminated pigments.

All four final products (sub-samples C, E, G, and I) were examined under scanning electron microscope (SEM) to determine the proportion of residual kaolin stacks. It was found that when the feed was ground to a shape factor of 15 or above, substantial majority of stacks would have been reduced to individual platelets. The proportion of kaolin stacks in sub-samples E, G, and I are less than 5 of all particles when viewed under SEM. The product that was made from grinding to a shape factor of 30 showed the thinnest platelets and least amount of stacks.

EXAMPLE 3

This example illustrates the use of a coarse reject from fractionation of a blend of Georgia Cretaceous clays and Tertiary clays.

A blend of Georgia Cretaceous and Tertiary crude clays was blunged, degritted, and subsequently processed through flotation using standard flotation techniques. The slurry product from flotation was then classified to produce a coarse reject fraction and a high brightness No. 1 clay size fine fraction. The coarse reject was used to produce the product of this invention. Its characteristics are listed below:

| | |
|---|---|
| Brightness | 80.2 |
| Particle size distribution: | |
| % finer than 5 microns | 58.8 |
| % finer than 2 microns | 33.5 |
| % finer than 0.5 microns | 19.7 |
| % finer than 0.25 microns | 12.7 |
| Shape Factor | 5.0 |

The coarse reject slip was ground to a shape factor of 16.5 and then classified to 82.5% less than 2 microns. To produce the product of invention, this classified slip had to be subsequently de-slimed to reduce the ultra-fine particles. The defined slurry was processed through magnet at a retention time of 2 minutes and then bleached and filtered. The final product is high in brightness, deficient in ultra-fine, and fluid at very high solid concentration. Its characteristics are shown below:

| | |
|---|---|
| Brightness | 89.47 |
| Particle size distribution | |
| (weight percent finer than E.S.D.) | |
| % finer than 5 microns | 98.4 |
| % finer than 2 microns | 79.9 |
| % finer than 1 microns | 60.7 |
| % finer than 0.5 microns | 41.7 |
| % finer than 0.25 microns | 17.7 |
| Shape Factor (S.F.) | 38.2 |

TABLE 2

| | | Ground to SF = 10: | | Ground to SF = 15: | | Ground to SF = 20: | | Ground to SF = 30: | |
|---|---|---|---|---|---|---|---|---|---|
| | Feed to Grinder (A) | Grinder Discharge (B) | Classified & Leached Product (C) | Grinder Discharge (D) | Classified & Leached Product (E) | Grinder Discharge (F) | Classified & Leached Product (G) | Grinder Discharge (H) | Classified & Leached Product (I) |
| Brightness | 85.99 | 86.57 | 89.26 | 87.22 | 89.51 | 87.35 | 89.78 | 87.67 | 89.77 |
| Particle size: | | | | | | | | | |
| % <10 um | 87.9 | 93.9 | 99.3 | 95.8 | 99.8 | 96.8 | 99.9 | 97.4 | 99.7 |
| % <5 um | 66.9 | 78.0 | 98.0 | 83.4 | 97.6 | 85.5 | 99.2 | 90.3 | 99.1 |
| % <2 um | 33.9 | 42.2 | 81.2 | 47.8 | 80.0 | 52.3 | 82.1 | 59.9 | 81.9 |
| % <1 um | 19.7 | 24.3 | 58.6 | 26.8 | 56.7 | 29.4 | 58.2 | 35.8 | 58.1 |
| % <0.5 um | 10.5 | 12.3 | 36.2 | 12.7 | 33.2 | 14.0 | 33.1 | 16.4 | 32.6 |
| % <0.25 um | 6.4 | 2.1 | 14.9 | 3.4 | 12.8 | 1.9 | 13.7 | 6.3 | 13.1 |
| S.F. | 6.2 | 10.6 | 22.1 | 15.4 | 26.3 | 20.5 | 30.6 | 29.8 | 36.9 |
| BET surface area, m$^2$/g | | | 12.09 | | 11.97 | | 12.06 | | 12.36 |
| Brookfield #2 @ 20 rpm | | | 540 cps | | 350 cps | | 250 cps | | 240 cps |
| Hercules @18 dynes | | | 200 rpm | | 220 rpm | | 180 rpm | | 160 rpm |
| Solids % | | | 70.00% | | 70.00% | | 69.10% | | 68.30% |

-continued

| | |
|---|---|
| Brookfield #2 at 20 rpm | 320 centipoises |
| Hercules at 18 dynes/CM × 10⁻⁵ | 280 rpm |
| Solids % | 70% |

While the present invention has been particularly set forth in specific embodiments thereof, it will be appreciated that many embodiments of the invention can be made and many changes can be made in the preferred embodiment without departing from the scope and spirit of the invention.

What is claimed is:

1. A method of providing a high brightness kaolin pigment product, comprising:
   (a) selecting a base kaolin clay crude to be processed, the selected base kaolin clay being hydrated kaolin clay having a particle size distribution wherein from about 30 to about 60% by weight of the particles have a particle size less than 2 microns and about 20% by weight is less than 0.25 micron;
   (b) forming an aqueous kaolin suspension of said kaolin clay crude;
   (c) subjecting said aqueous kaolin suspension of said clay crude to a grinding step where the kaolin particles are ground to a shape factor ranging from about 10 to about 30; and
   (d) classifying said ground particles to a particle size distribution characterized in that about 80% to about 90% by weight of the particles are less than 2 microns, and about 20% by weight is less than 0.25 micron.

2. A method of claim 1 including grinding said particles of said kaolin of step (c) to a shape factor ranging from 13 to 18.

3. A method of claim 1 further including prior to the grinding and classifying said particles, subjecting said aqueous kaolin suspension to a magnetic separation process to remove a substantial, portion of iron impurities from said kaolin clay.

4. A method of claim 1 further including after classifying said ground particles of step (d), dewatering said aqueous kaolin to a solids level of about 70% by weight.

5. A method of claim 2 including subjecting said particles of step (d) to a defining process if more than 20% by weight of said particles is greater than 0.25 microns.

6. A method of making light weight coating applications for groundwood paper products comprising adding to said light weight coating applications for groundwood paper products, a high brightness kaolin pigment product made according to the method of claim 1.

7. A high brightness kaolin pigment product produced in accordance with claim 1, said pigment having a G.E. brightness ranging between 88 and 92.

8. A high brightness kaolin pigment product of claim 7, said pigment having a particle size distribution wherein less than 99% by weight of the kaolin particles have a particle size less than 2 microns and about less than 20% by weight of the kaolin particles have a particle size less than 0.25 micron.

9. A high brightness kaolin pigment product of claim 6 formed into an aqueous slurry having a solids level of about 70% by weight, a low shear Brookfield viscosity below 550 cps, and a high shear Hercules viscosity of about 18 dyne-cm at above 190 rpm, using an "A" bob.

10. A process for preparing a kaolin clay composition for use in lightweight coating applications for groundwood paper products, comprising:
    delaminating the kaolin clay crude; and controlling the degree of the delaminating process of the kaolin clay by measuring the shape factor of the kaolin clay.

11. A process of claim 10 wherein said measuring step is done simultaneously during the delaminating stop.

12. A process of claim 10 wherein the delaminating step is discontinued when the shape factor of the kaolin clay ranges from 13 to 18.

* * * * *

UNITED STATES PATENT AND TRADEMARK OFFICE
CERTIFICATE OF CORRECTION

PATENT NO.    : 6,514,333 B1
DATED         : February 4, 2003
INVENTOR(S)   : Yuan et al.

It is certified that error appears in the above-identified patent and that said Letters Patent is hereby corrected as shown below:

Title page,
Item [73], Assignee, "Rosewell, GA" should read -- Roswell, GA --.

Column 11,
Line 38, after "substantial", delete the comma.

Column 12,
Line 7, "light weight" should read -- lightweight --.
Line 9, "light weight" should read -- lightweight --.
Line 34, "stop" should read -- step --.

Signed and Sealed this

Twenty-fifth Day of March, 2003

JAMES E. ROGAN
*Director of the United States Patent and Trademark Office*